US010929321B2

(12) United States Patent
Matsumoto

(10) Patent No.: US 10,929,321 B2
(45) Date of Patent: Feb. 23, 2021

(54) COMMUNICATION APPARATUS, COMMUNICATION METHOD, PROGRAM, AND COMMUNICATION SYSTEM WITH AVOIDANCE OF FALSE DETECTION OF SIGNAL LEVEL CHANGES

(71) Applicant: Sony Corporation, Tokyo (JP)

(72) Inventor: Hideyuki Matsumoto, Tokyo (JP)

(73) Assignee: Sony Corporation, Tokyo (JP)

( * ) Notice: Subject to any disclaimer, the term of this patent is extended or adjusted under 35 U.S.C. 154(b) by 242 days.

(21) Appl. No.: 15/780,786

(22) PCT Filed: Dec. 2, 2016

(86) PCT No.: PCT/JP2016/085855
§ 371 (c)(1),
(2) Date: Jun. 1, 2018

(87) PCT Pub. No.: WO2017/104437
PCT Pub. Date: Jun. 22, 2017

(65) Prior Publication Data
US 2020/0167301 A1 May 28, 2020

(30) Foreign Application Priority Data
Dec. 16, 2015 (JP) .............................. JP2015-244899

(51) Int. Cl.
*G06F 13/362* (2006.01)
*G06F 13/42* (2006.01)

(52) U.S. Cl.
CPC ...... *G06F 13/3625* (2013.01); *G06F 13/4291* (2013.01)

(58) Field of Classification Search
CPC .......................... G06F 13/3625; G06F 13/4291
See application file for complete search history.

(56) References Cited

U.S. PATENT DOCUMENTS 5,878,234 A * 3/1999 Dutkiewicz ........... G06F 13/423
710/110
6,530,029 B1 * 3/2003 Metchev ............. G06F 13/4291
713/400

(Continued)

FOREIGN PATENT DOCUMENTS

| JP | 07-303034 A | 11/1995 |
| JP | 09-083317 A | 3/1997 |
| JP | 2009-517952 A | 4/2009 |

OTHER PUBLICATIONS

Z. Hu, "I2C Protocol Design for Resuability," IEEE, 2010 Third International Symposium, pp. 1-6, Oct. 15-17, 2010.

*Primary Examiner* — Tim T Vo
*Assistant Examiner* — Phong H Dang
(74) *Attorney, Agent, or Firm* — Michael Best & Friedrich LLP

(57) ABSTRACT

The present disclosure relates to a communication apparatus, a communication method, a program, and a communication system that enable more reliable communication.
A bus IF is constituted by a master having an initiative of communication and a slave that communicates with the master under the control of the master. Additionally, the slave is provided with a detection unit that, when detecting a change in level of a signal line representing a declaration of initiation or end of communication by the master, outputs a detection signal indicating that the change in level of the signal line representing a declaration of initiation or end of communication has been detected, and a false detection avoidance unit that invalidates output of the detection signal during a specific time slot set in advance. The present technology can be applied to, for example, a bus IF that performs communication in conformity with the I3C standard.

12 Claims, 10 Drawing Sheets

(56) References Cited

U.S. PATENT DOCUMENTS

| | | | | |
|---|---|---|---|---|
| 2004/0010728 A1* | 1/2004 | Musumeci | ............ | H03K 5/1252 |
| | | | | 713/400 |
| 2008/0177918 A1* | 7/2008 | Lee | ..................... | G06F 13/4291 |
| | | | | 710/110 |
| 2015/0081936 A1* | 3/2015 | Low | ..................... | G06F 13/4282 |
| | | | | 710/105 |
| 2015/0286607 A1* | 10/2015 | Cvejanovic | ......... | G06F 11/3055 |
| | | | | 710/110 |
| 2017/0104655 A1* | 4/2017 | Takahashi | ............. | H04L 1/0063 |

* cited by examiner

COMMUNICATION APPARATUS, COMMUNICATION METHOD, PROGRAM, AND COMMUNICATION SYSTEM WITH AVOIDANCE OF FALSE DETECTION OF SIGNAL LEVEL CHANGES

TECHNICAL FIELD

The present disclosure relates to a communication apparatus, a communication method, a program, and a communication system and, in particular, to a communication apparatus, a communication method, a program, and a communication system that enable more reliable communication.

BACKGROUND ART

Conventionally, for example, an inter-integrated circuit (I2C) is widely used as a bus interface (IF) used for communication between devices via a bus within a board on which a plurality of devices are mounted. Meanwhile, in recent years, it has been required to achieve a high-speed I2C and the provision of an improved inter-integrated circuit (I3C) is advancing as the next generation standard.

Incidentally, in communication via the bus IF, it is generally feared that communication cannot be performed normally due to the generation of a short pulse on a signal line.

Therefore, for example, a glitch filter for erasing a noise pulse generated on a small computer system interface (SCSI) bus (for example, refer to Patent Document 1), a short pulse removal circuit for removing a pulse in a complementary metal oxide semiconductor (CMOS) inverter circuit (for example, refer to Patent Document 2), and the like have been proposed.

CITATION LIST

Patent Document

Patent Document 1: Japanese Patent Application Laid-Open No. 7-303034
Patent Document 2: Japanese Patent Application Laid-Open No. 9-83317

SUMMARY OF THE INVENTION

Problems to be Solved by the Invention

As described above, a technology for erasing or removing a short pulse has been proposed in the past but, in the I3C, it is required to avoid the influence due to the generation of a short pulse and enable more reliable communication.

The present technology has been made in view of such a situation and is intended to enable more reliable communication.

Solutions to Problems

A communication apparatus according to an aspect of the present disclosure includes: a detection unit that, when detecting a change in level of a signal line representing a declaration of initiation or end of communication by another communication apparatus having an initiative of communication, outputs a detection signal indicating that the change in level of the signal line has been detected; and a false detection avoidance unit that invalidates output of the detection signal during a specific time slot set in advance.

A communication method or a program according to an aspect of the present disclosure includes: a step of outputting, when detecting a change in level of a signal line representing a declaration of initiation or end of communication by another communication apparatus having an initiative of communication, a detection signal indicating that the change in level of the signal line has been detected; and a step of invalidating output of the detection signal during a specific time slot set in advance.

A communication system according to an aspect of the present disclosure includes: a first communication apparatus having an initiative of communication; and a second communication apparatus that communicates with the first communication apparatus under control of the first communication apparatus, in which the second communication apparatus includes: a detection unit that, when detecting a change in level of a signal line representing a declaration of initiation or end of the communication by the first communication apparatus, outputs a detection signal indicating that the change in level of the signal line has been detected; and a false detection avoidance unit that invalidates output of the detection signal during a specific time slot set in advance.

In an aspect of the present disclosure, when a change in level of a signal line representing a declaration of initiation or end of communication is detected, a detection signal indicating that this change in level of the signal line has been detected is output and output of the detection signal is invalidated during a specific time slot set in advance.

Effects of the Invention

According to an aspect of the present disclosure, communication can be performed more reliably.

MODE FOR CARRYING OUT THE INVENTION

Hereinafter, detailed embodiments to which the present technology is applied will be precisely described with reference to the drawings.

<Exemplary Configuration of Bus IF>

Figure 1:
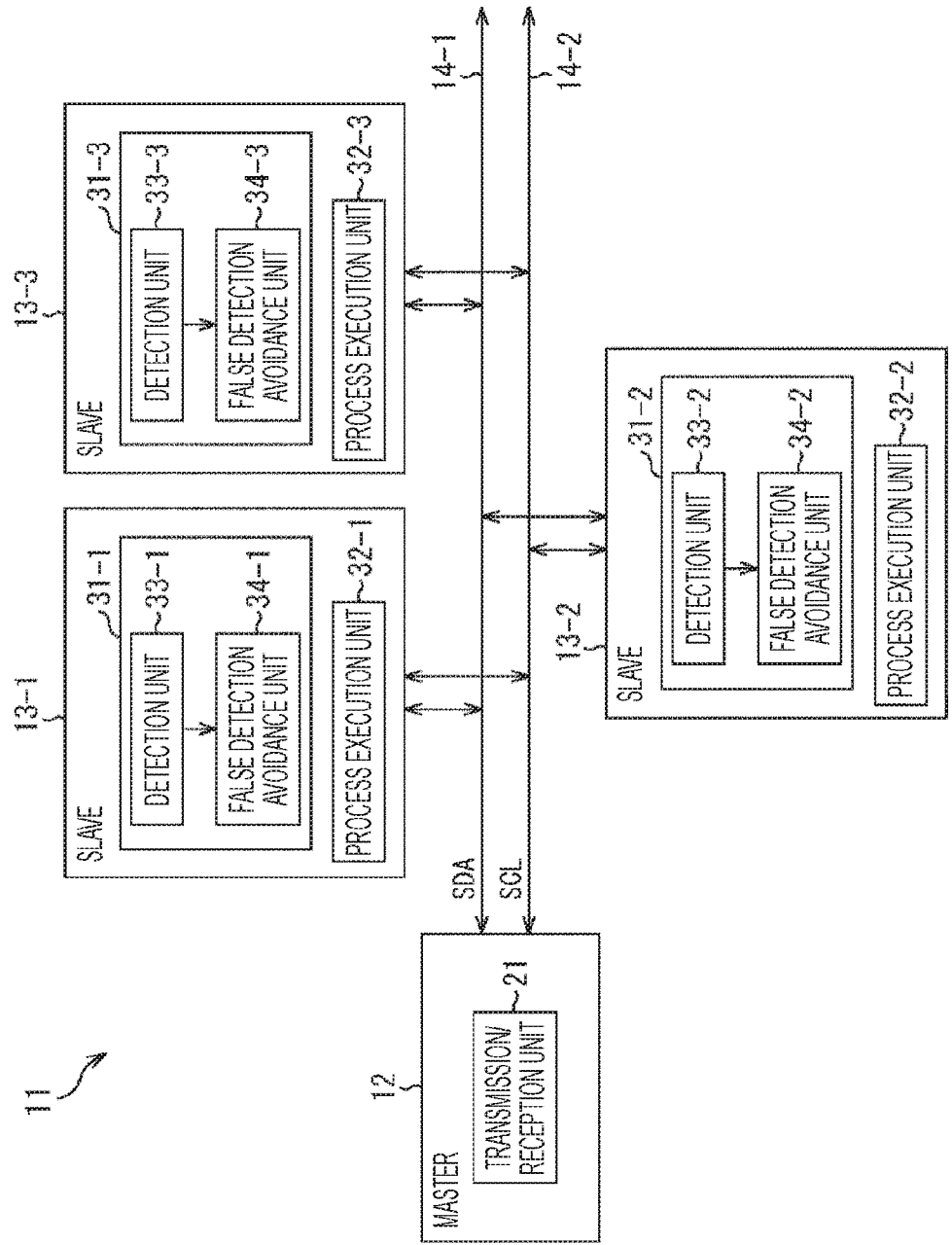
FIG. 1 is a block diagram illustrating an exemplary configuration of a bus IF according to an embodiment to which the present technology is applied.

FIG. 1 is a block diagram illustrating an exemplary configuration of a bus IF according to an embodiment to which the present technology is applied.

The bus IF 11 illustrated in FIG. 1 is configured such that a master 12 and three slaves 13-1 to 13-3 are connected by a data signal line 14-1 and a clock signal line 14-2. For example, in the bus IF 11, communication in conformity with the I3C standard as mentioned above is performed and a signal is transported via the data signal line 14-1 and the clock signal line 14-2. Four transport techniques with different speeds are defined in the I3C and functions such as communication interruption, connection under an activated state (Hot Join), a system configuration with a second master 12 (Secondary Master), and direct communication between the slaves 13 (P2P Slave) are implemented.

The master 12 has the initiative of communication in the bus IF 11 and communicates with the slaves 13-1 to 13-3 via the data signal line 14-1 and the clock signal line 14-2. For example, the master 12 is provided with a transmission/reception unit 21 so as to be able to transmit and receive signals to and from the slaves 13-1 to 13-3 when the transmission/reception unit 21 changes potentials of the data signal line 14-1 and the clock signal line 14-2 between an H level and an L level. For example, pieces of serial data (SDA) are sequentially transported bit by bit via the data signal line 14-1 and a serial clock (SCL) of a predetermined frequency is transported via the clock signal line 14-2.

The slaves 13-1 to 13-3 can communicate with the master 12 via the data signal line 14-1 and the clock signal line 14-2 under the control of the master 12. Note that the slaves 13-1 to 13-3 each have a similar configuration and hereinafter will be simply referred to as slaves 13 unless it is necessary to distinguish the slaves 13-1 to 13-3. The same applies to each block constituting the slave 13. For example, as illustrated in FIG. 1, the slave 13 is configured with a transmission/reception unit 31 and a process execution unit 32 provided therein and the transmission/reception unit 31 has a detection unit 33 and a false detection avoidance unit 34.

As with the transmission/reception unit 21 of the master 12, the transmission/reception unit 31 can transmit and receive signals to and from the master 12 on the basis of a change in levels of the data signal line 14-1 and the clock signal line 14-2.

The process execution unit 32 executes a process in agreement with the function of each of the slaves 13. For example, in a case where the slave 13 is a memory or a register, the process execution unit 32 writes and reads data. In addition, in a case where the slave 13 is a sensor, the process execution unit 32 acquires sensed data.

The detection unit 33 detects a change in levels of the data signal line 14-1 and the clock signal line 14-2, which represents a declaration of initiation or end of communication by the master 12. Then, when detecting a change in levels of the data signal line 14-1 and the clock signal line 14-2 representing a declaration of initiation or end of communication, the detection unit 33 supplies a detection signal indicating information to that effect (for example, a start detection signal or a stop detection signal) to the false detection avoidance unit 34.

As will be described later with reference to FIG. 7, the false detection avoidance unit 34 is set with a specific time slot in advance and invalidates the detection signal output from the detection unit 33 during this time slot such that false detection of initiation or end of communication is avoid.

In the communication in the bus IF 11 configured in this manner, the master 12 always has the right to communicate and data is transferred on the data signal line 14-1 with a clock supplied to the clock signal line 14-2 by the master 12 as a reference.

Here, the communication in the bus IF 11 will be described with reference to FIG. 2.

Figure 2:
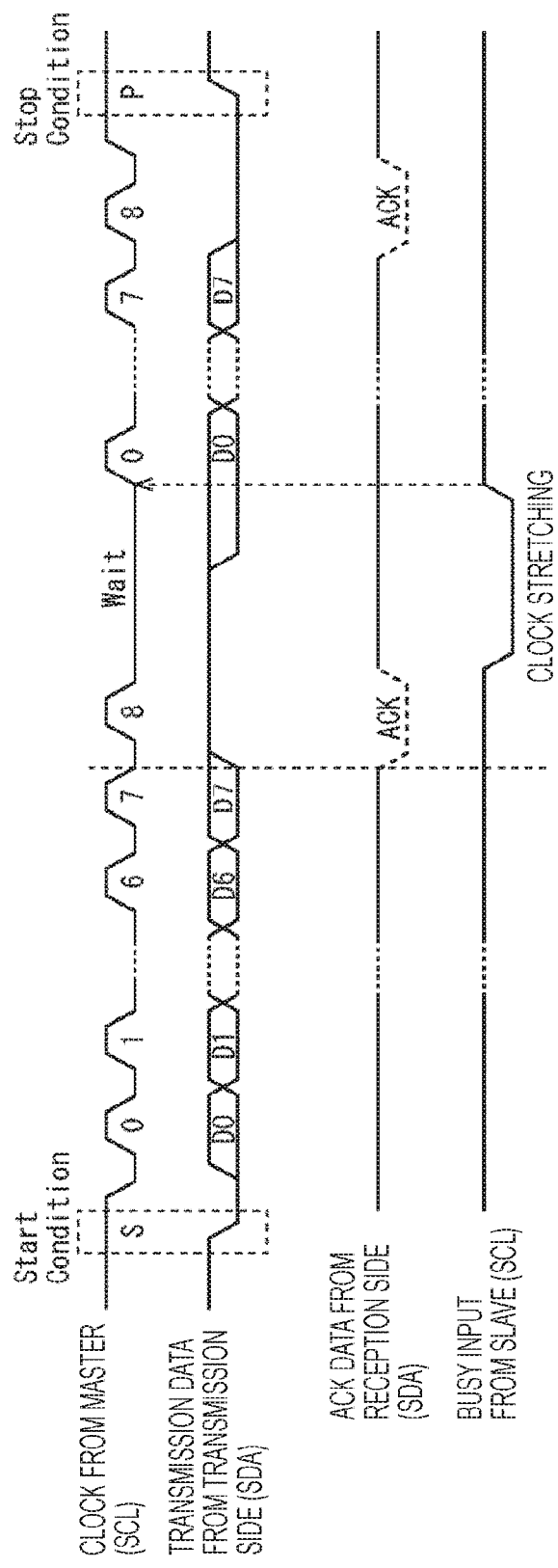
FIG. 2 is a diagram for explaining communication in the bus IF.

From the upper side of FIG. 2, the waveform of the clock supplied from the master 12 to the clock signal line 14-2, the waveform of transmission data supplied from a transmission side to the data signal line 14-1, the waveform of ACK data supplied from a reception side to the data signal line 14-1, and the waveform when the slave 13 forcibly adjusts the clock signal line 14-2 to the L level (clock stretching) are illustrated in order.

For example, both the data signal line 14-1 and the clock signal line 14-2 are adjusted to the H level during a standby state in which communication is not performed in the bus IF 11. Then, while the clock signal line 14-2 is at the H level, the master 12 changes the data signal line 14-1 from the H level to the L level, thereby declaring the initiation of the communication (start condition). Subsequently, the communication is performed and, thereafter, the master 12 changes the data signal line 14-1 from the L level to the H level while the clock signal line 14-2 is at the H level, thereby declaring the end of the communication (stop condition).

Note that the bus IF 11 is defined such that the data signal line 14-1 changes only while the clock signal line 14-2 is at the L level at the time of ordinary transmission of data, that is, except when the initiation or end of communication is declared.

In addition, in the bus IF 11, for example, signals to transmit pieces of data D0 to D7 are output from the master 12 in zeroth to seventh time slots according to the clocks output from the master 12. Then, in an eighth time slot, the slave 13 outputs a signal to transmit an acknowledgement (ACK: reception completion notification) indicating that the reception of the pieces of data D0 to D7 has been completed.

Note that, in order to notify that the slave 13 is in a busy state, the bus IF 11 is defined such that the slave 13 forcibly adjusts the clock signal line 14-2 to the L level until the writing and the like of the received data at the slave 13 as the reception side is completed (clock stretching). In this manner, while the slave 13 forcibly adjusts the clock signal line 14-2 to the L level, the master 12 is put in the standby state.

As described above, in the communication using one data signal line 14-1 to transfer data such that reading and writing are enabled, there is a timing of switching between transmission and reception of data. At this timing of switching, since a process of switching transmission and reception is performed at each of the master 12 and the slave 13 on the basis of the clock transmitted through the clock signal line 14-2, there is a possibility of a short pulse (glitch) generating on the data signal line 14-1.

For example, when a short pulse is generated on the data signal line 14-1 while the clock signal line 14-2 is at the H level, it is feared that the slave 13 erroneously determines this short pulse as a start condition or a stop condition.

Note that, although there is a possibility that a short pulse is generated also in the I2C, the I2C is defined such that data changes only while the clock is at the L level and thus there has not been a case where a short pulse is erroneously determined as the start condition or the stop condition in the past. In contrast to this, in the I3C, since data may change while the clock is at the H level, there is a possibility that a short pulse is erroneously determined as the start condition or the stop condition.

Figure 3:
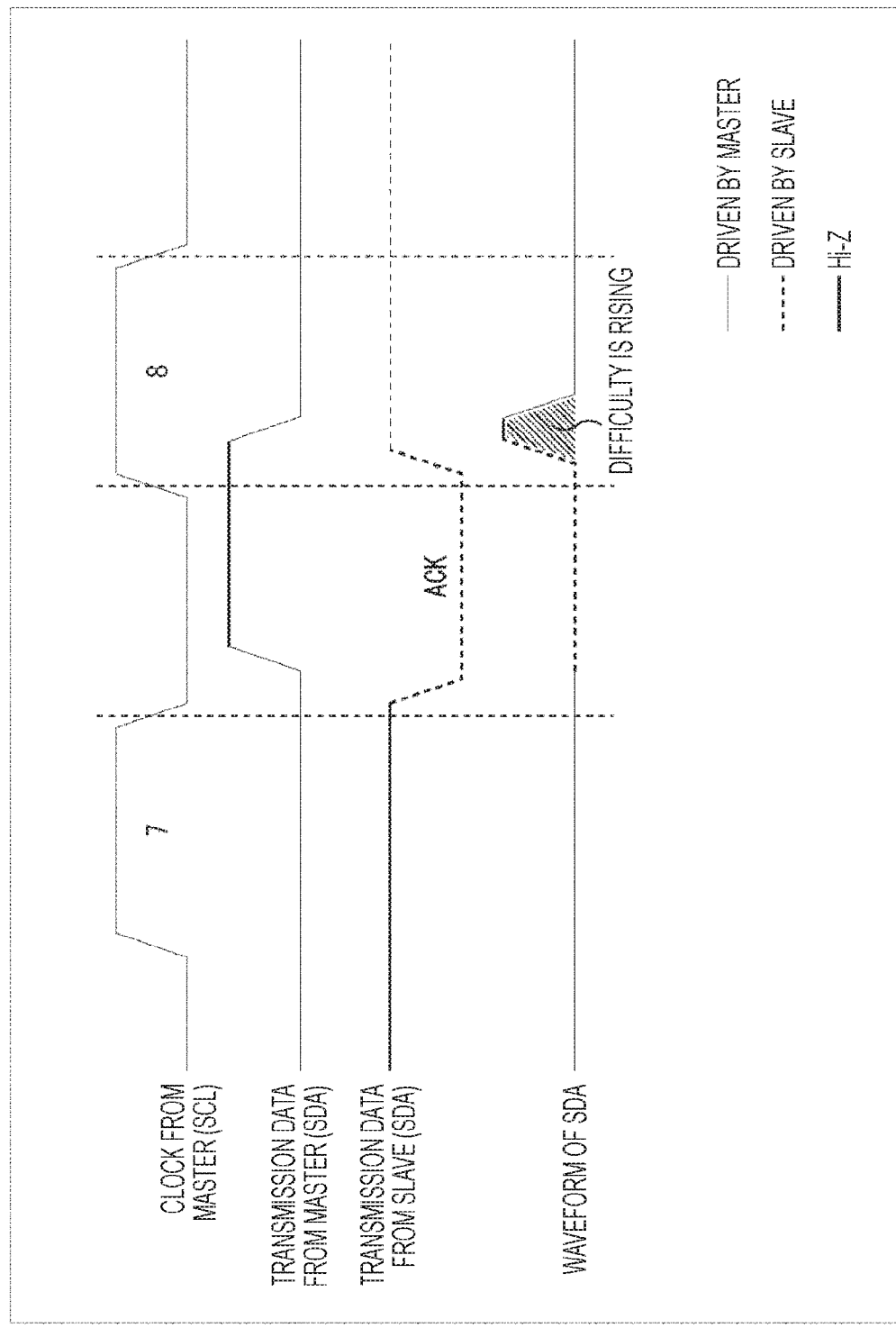
FIG. 3 is a diagram for explaining the generation of a short pulse.

For example, as illustrated in FIG. 3, after the seventh time slot ends and the clock signal line 14-2 changes from the H level to the L level, the slave 13 changes the data signal line 14-1 from the H level to the L level to transmit the ACK (0 of one bit). Then, after the clock signal line 14-2 changes from the L level to the H level in the eighth time slot, the slave 13 changes the data signal line 14-1 from the L level to the H level to end the transmission of the ACK.

At this time, in a case where the master 12 changes the data signal line 14-1 from the H level to the L level after the slave 13 changes the data signal line 14-1 from the L level to the H level, a waveform in which the data signal line 14-1 is adjusted to the H level only for a short time is generated (short pulse). At that time, since the clock signal line 14-2 is at the H level, it is conceivable that the slave 13 erroneously determines this short pulse as the start condition or the stop condition. Therefore, communication is resumed or discontinued halfway due to such erroneous determination and it is assumed that it becomes difficult to perform reliable communication.

Meanwhile, in the bus IF 11, the time slot having a possibility of generation of the short pulse as illustrated in FIG. 3 can be specified in advance. For example, there is a possibility that a short pulse is generated at the timing at which the transmission and the reception of data are switched between the master 12 and the slave 13.

<Time Slot Having Possibility of Generation of Short Pulse>

Figure 4:
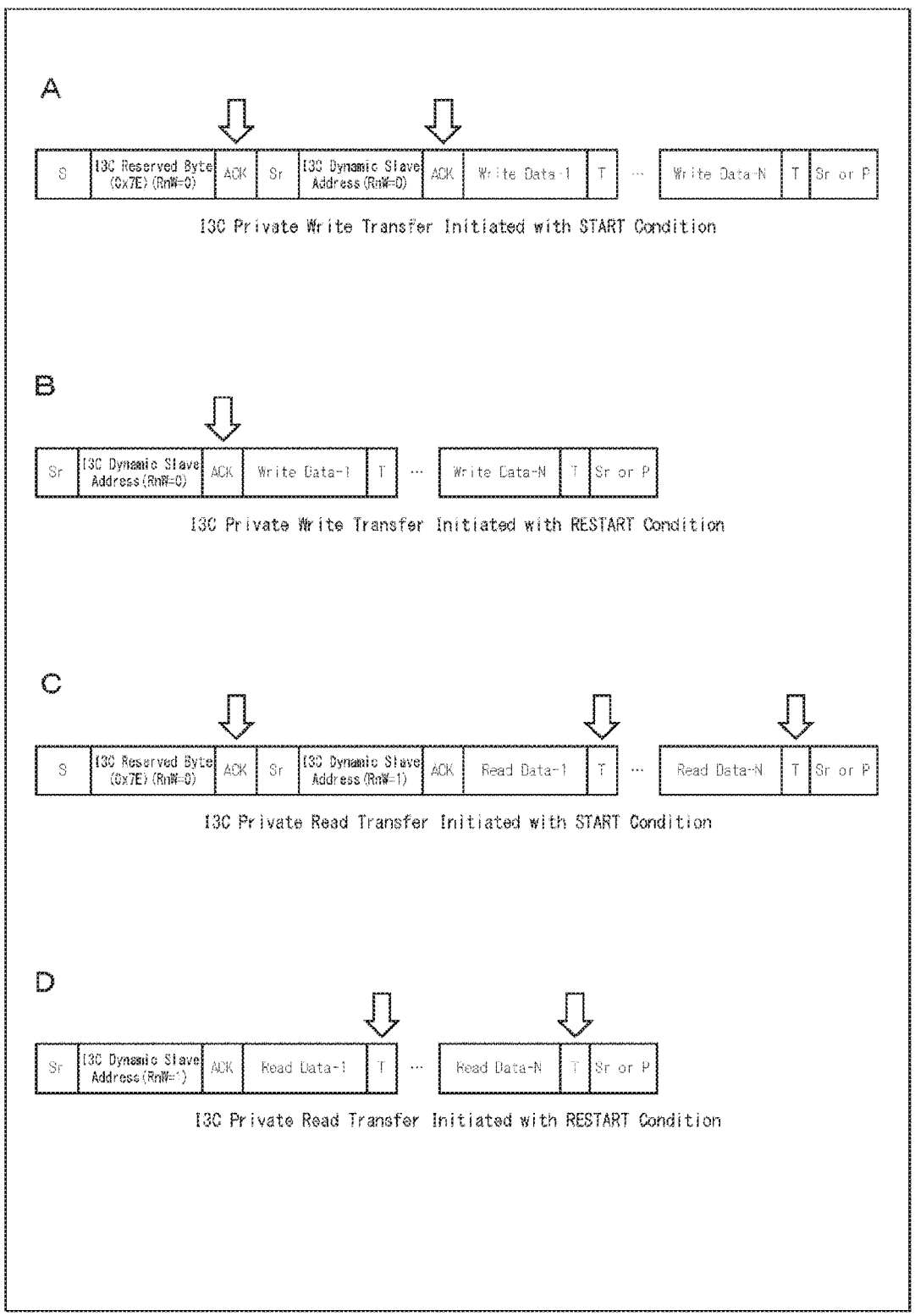
FIG. 4 is a diagram illustrating examples of a time slot having a possibility of generation of a short pulse.

Here, FIG. 4 illustrates examples of the time slot having a possibility of generation of the short pulse in the I3C.

For example, as illustrated in A of FIG. 4, there is a possibility that a short pulse is generated in a time slot in which the master 12 transmits a command instructing data writing after the start condition (S) and the slave 13 transmits the ACK in response to the reception of this command. Subsequently, there is a possibility that a short pulse is generated in a time slot in which the master 12 transmits the address of the slave 13 to which the data is to be written after a restart (Sr) and the slave 13 transmits the ACK in response to the reception of this address.

Likewise, as illustrated in B of FIG. 4, there is a possibility that a short pulse is generated in a time slot in which the master 12 transmits the address of the slave 13 to which the data is to be written after a restart (Sr) and the slave 13 transmits the ACK in response to the reception of this address.

Figure 5:
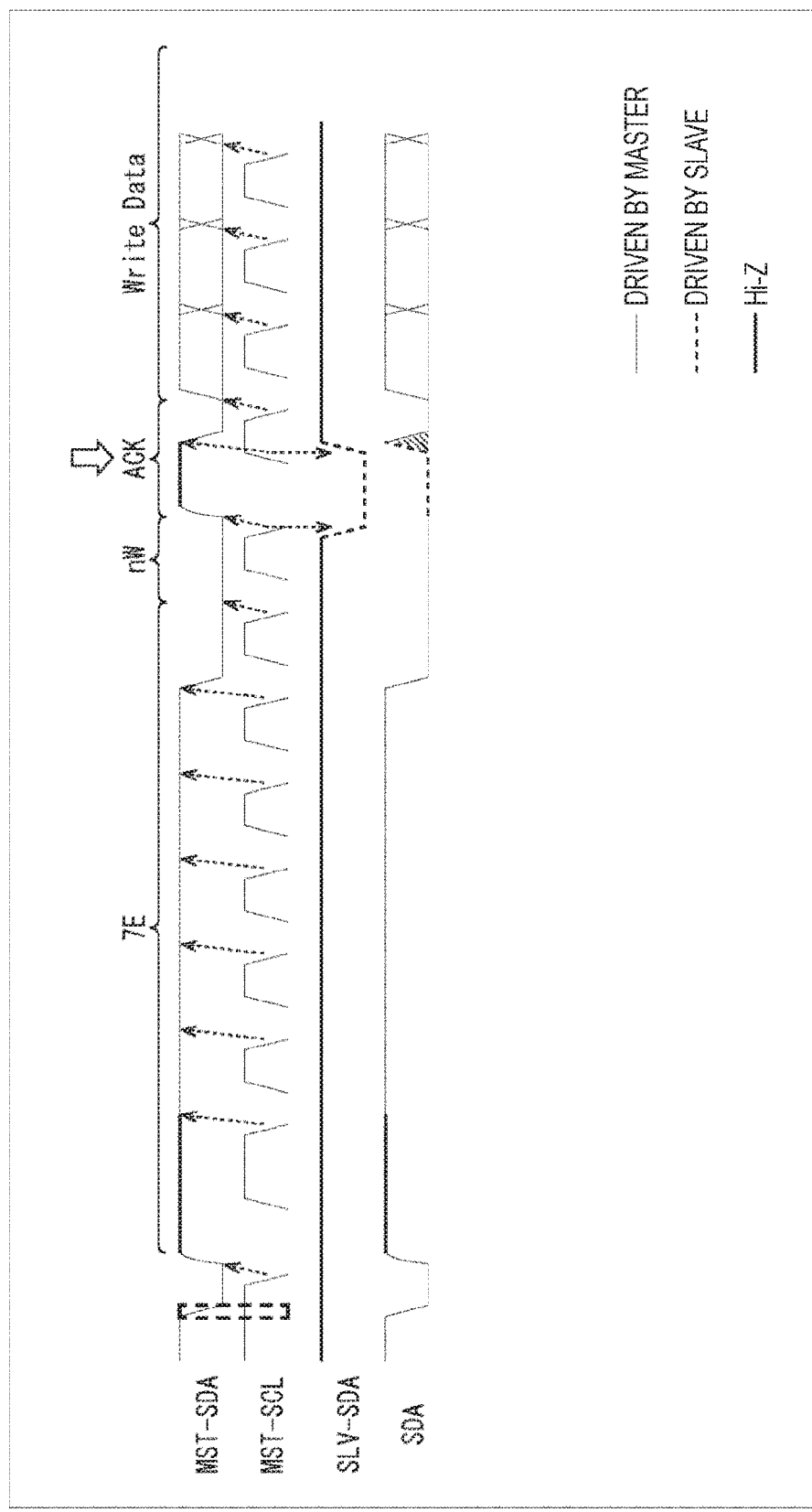
FIG. 5 is a diagram for explaining the generation of a short pulse.

In more detail, as illustrated in FIG. 5, during the time slot in which the slave 13 transmits the ACK, while the clock (MST-SCL) supplied to the clock signal line 14-2 by the master 12 is at the H level, the master 12 drives the signal (MST-SDA) to be supplied to the data signal line 14-1 from the H level to the L level. If the slave 13 drives the signal (SLV-SDA) to be supplied to the data signal line 14-1 from the L level to the H level prior to the above driving, a short pulse is generated on the data signal line 14-1. Note that, in a case where the order of these driving processes is reversed, the generation of a short pulse is avoided.

In addition, as illustrated in C of FIG. 4, there is a possibility that a short pulse is generated in a time slot in which the master 12 transmits a command instructing data reading after the start condition (S) and the slave 13 transmits the ACK in response to the reception of this command. Thereafter, there is a possibility that a short pulse is generated in a time slot in which the slave 13 transmits the read data and transmits a one-bit parity (T) subsequently to this data.

Similarly, as illustrated in D of FIG. 4, there is a possibility that a short pulse is generated in a time slot in which the master 12 transmits the address of the slave 13 from which the data is to be read after a restart (Sr) and the slave 13 transmits the ACK and the read data and transmits a one-bit parity (T) subsequently to this data.

Figure 6:
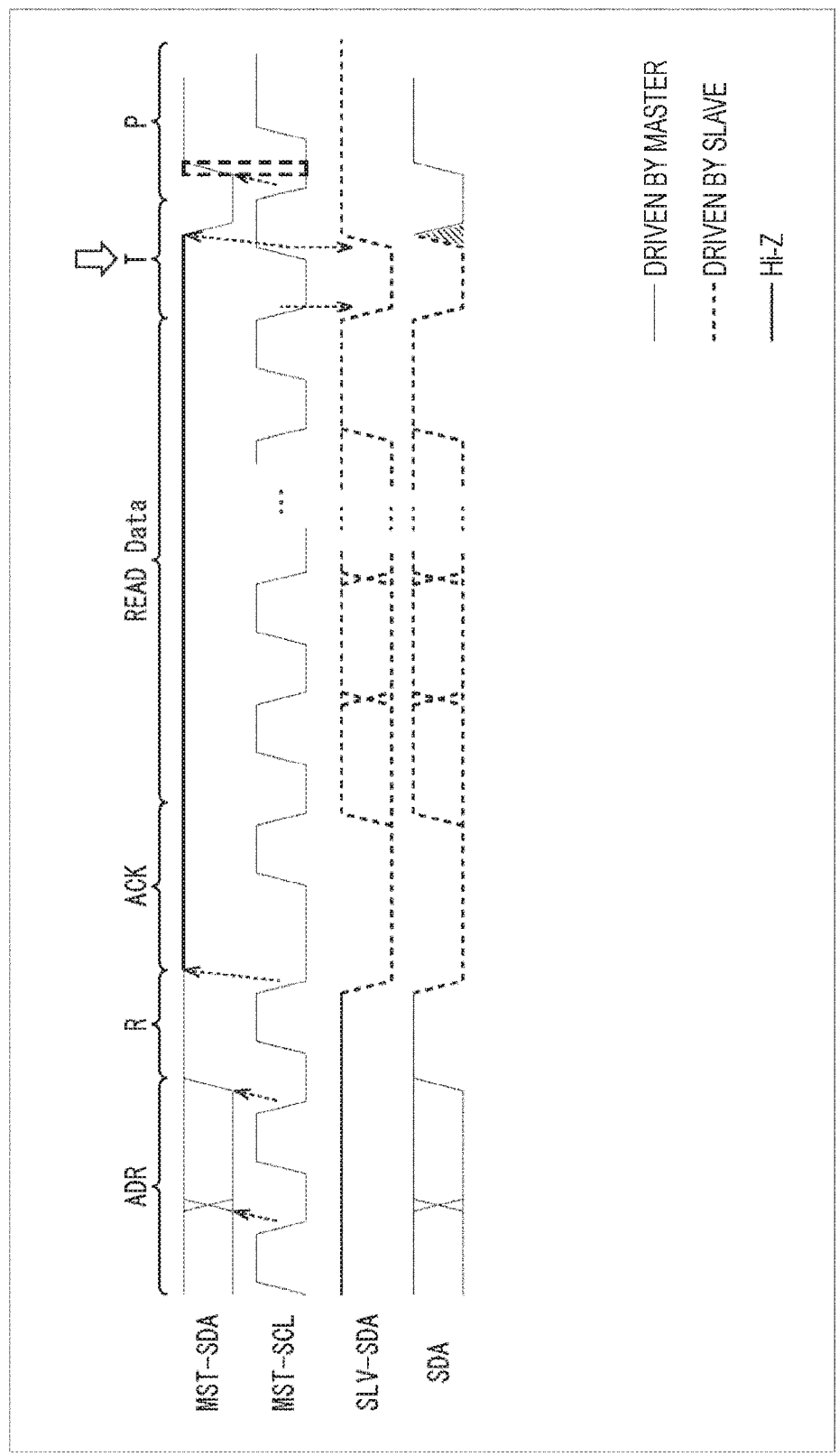
FIG. 6 is a diagram for explaining the generation of a short pulse.

In more detail, as illustrated in FIG. 6, during the time slot in which the slave 13 transmits the one-bit parity (T), while the clock (MST-SCL) supplied to the clock signal line 14-2 by the master 12 is at the H level, the master 12 drives the signal (MST-SDA) to be supplied to the data signal line 14-1 from the H level to the L level. If the slave 13 drives the signal (SLV-SDA) to be supplied to the data signal line 14-1 from the L level to the H level prior to the above driving, a short pulse is generated on the data signal line 14-1. Note that, in a case where the order of these driving processes is reversed, the generation of a short pulse is avoided.

As described above, in the I3C, it can be specified in advance that there is a possibility that a short pulse is generated in specific time slots as illustrated in FIGS. 4 to 6.

Therefore, the transmission/reception unit 31 of the slave 13 is configured to avoid such a short pulse from being falsely detected as the start condition or the stop condition.

<Exemplary Configuration of Transmission/Reception Unit of Slave>

Figure 7:
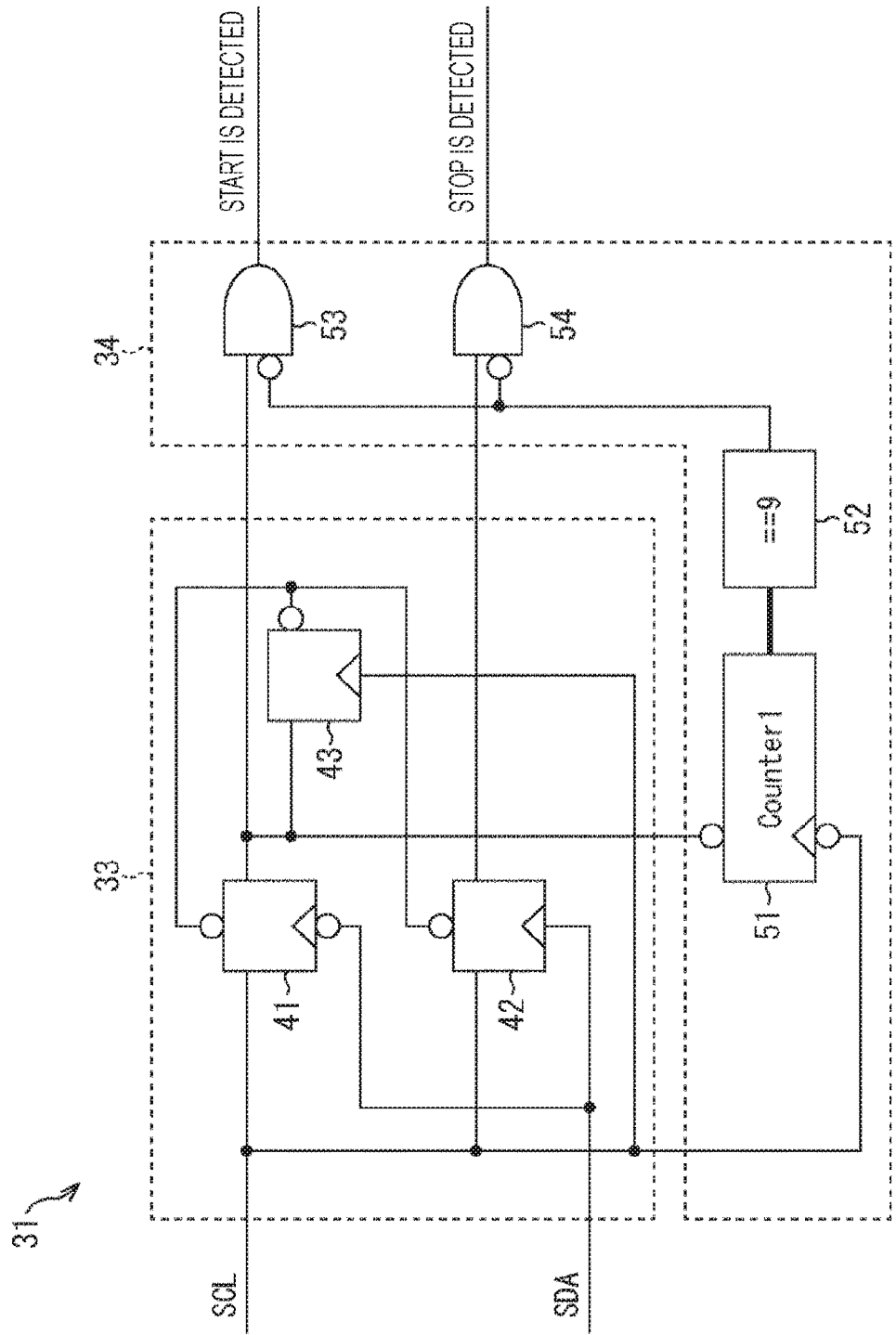
FIG. 7 is a diagram illustrating a circuit diagram of an exemplary configuration of a transmission/reception unit of a slave.

FIG. 7 illustrates a circuit diagram as one exemplary configuration of the transmission/reception unit 31 of the slave 13.

As illustrated in FIG. 7, the transmission/reception unit 31 has the detection unit 33 and the false detection avoidance unit 34. The detection unit 33 is configured by combining three flip-flop circuits 41 to 43 and the false detection avoidance unit 34 is configured by combining a counter circuit 51, a specific slot detection circuit 52, and an AND circuits 53 and 54.

The flip-flop circuits 41 to 43 constantly monitor a change in the data signal line 14-1 and the clock signal line 14-2. Then, when the data signal line 14-1 changes from the H level to the L level while the clock signal line 14-2 is at the H level, the signal output from the flip-flop circuit 41 is adjusted to the H level. In addition, when the data signal line 14-1 changes from the L level to the H level while the clock signal line 14-2 is at the H level, the signal output from the flip-flop circuit 42 is adjusted to the H level.

A clock is supplied to the counter circuit 51 from the clock signal line 14-2 and also a signal output from the flip-flop circuit 41 is supplied to the counter circuit 51. Then, when the flip-flop circuit 41 detects that the data signal line 14-1 has changed from the H level to the L level while the clock signal line 14-2 is at the H level, the counter circuit 51 initiates to count the clock and supplies the count value to the specific slot detection circuit 52.

In the specific slot detection circuit 52, a specific time slot having a possibility of generation of a short pulse is set in advance. For example, as in the example of FIG. 5 described above, a ninth time slot in which the ACK is transmitted from the slave 13 is set. Then, the specific slot detection circuit 52 outputs the signal at the H level to the AND circuits 53 and 54 during a period of the specific time slot set according to the count value supplied from the counter circuit 51.

A signal output from the flip-flop circuit 41 is supplied to the AND circuit 53 and also signal output from the specific slot detection circuit 52 is inverted and supplied to the AND circuit 53. Then, the AND circuit 53 outputs the H level when both of these inputs are at the H level and outputs a start detection signal indicating that the start condition has been detected.

That is, the AND circuit 53 outputs the start detection signal at the H level when the flip-flop circuit 41 is outputting the H level because the data signal line 14-1 changes from the H level to the L level while the clock signal line 14-2 is at the H level and the specific slot detection circuit 52 is outputting the L level because of not being in the time slot having a possibility of generation of a short pulse. On the other hand, the AND circuit 53 outputs the start detection signal at the L level (that is, a signal indicating that a start condition has not been detected) when the specific slot detection circuit 52 is outputting the H level because of being in the time slot having a possibility of generation of a short pulse even if the flip-flop circuit 41 is outputting the H level because the data signal line 14-1 changes from the H level to the L level while the clock signal line 14-2 is at the H level.

Similarly, a signal output from the flip-flop circuit 42 is supplied to the AND circuit 54 and also a signal output from the specific slot detection circuit 52 is inverted and supplied to the AND circuit 54. Then, the AND circuit 54 outputs the H level when both of these inputs are at the H level and outputs a stop detection signal indicating that the stop condition has been detected.

That is, the AND circuit 54 outputs the stop detection signal at the H level when the flip-flop circuit 41 is outputting the H level because the data signal line 14-1 changes from the L level to the H level while the clock signal line 14-2 is at the H level and the specific slot detection circuit 52 is outputting the L level because of not being in the time slot having a possibility of generation of a short pulse. On the other hand, the AND circuit 54 outputs the stop detection signal at the L level (that is, a signal indicating that a stop condition has not been detected) when the specific slot detection circuit 52 is outputting the H level because of being in the time slot having a possibility of generation of a short pulse even if the flip-flop circuit 41 is outputting the H level because the data signal line 14-1 changes from the L level to the H level while the clock signal line 14-2 is at the H level.

Figure 8:
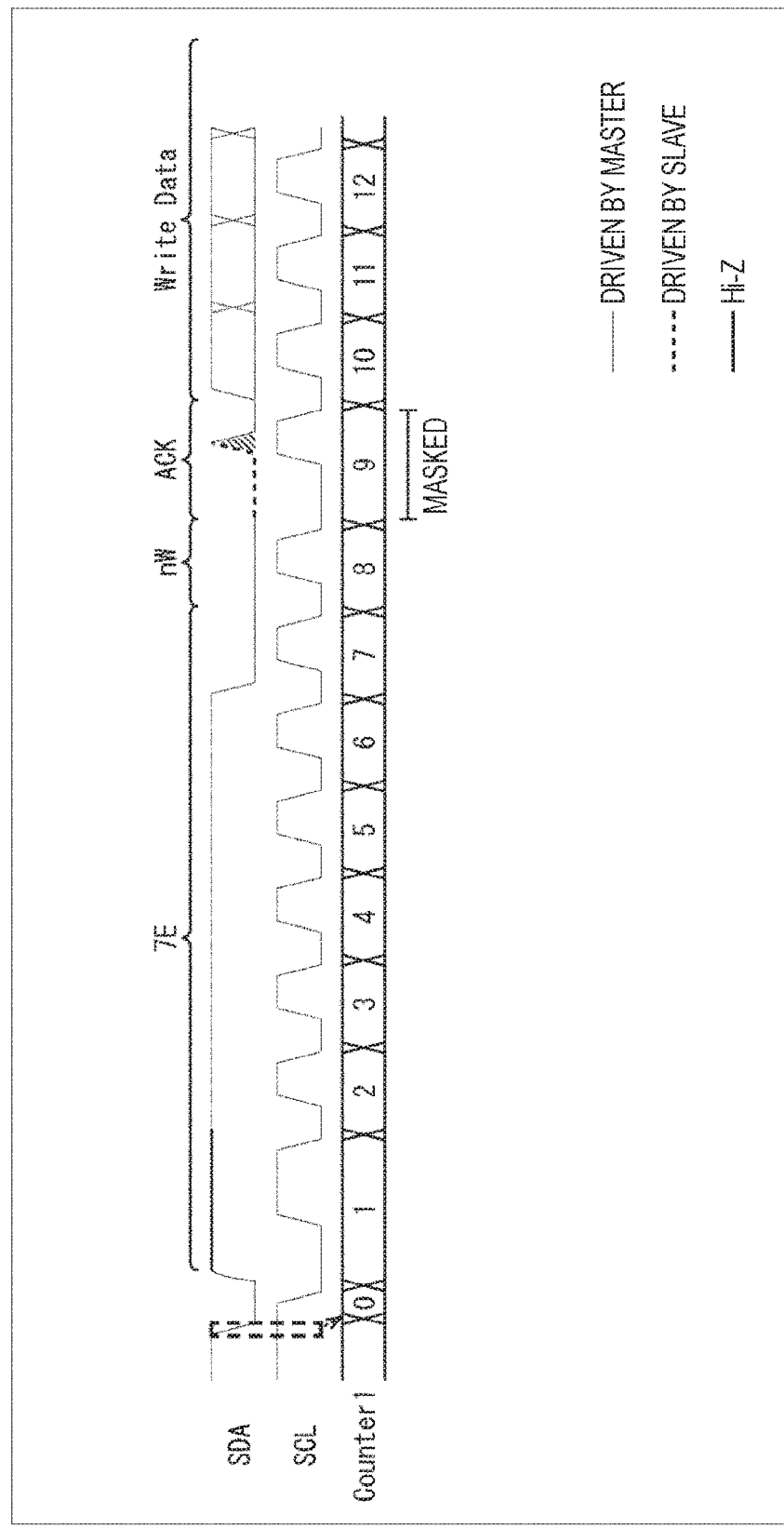
FIG. 8 is a diagram for explaining an example of masking a time slot having a possibility of generation of a short pulse.

In the transmission/reception unit 31 of the slave 13 configured as described above, the counter circuit 51 detects the start condition and counts the count value of the clock supplied via the clock signal line 14-2, as illustrated in FIG. 8. Then, the specific slot detection circuit 52 masks the output from the detection unit 33 during the ninth time slot set in advance. With this configuration, even if a short pulse is generated during the time slot in which the slave 13 transmits the ACK, the signal output from the detection unit 33 is invalidated and this short pulse is avoided from being erroneously recognized as a start condition or a stop condition.

Note that, although FIGS. 7 and 8 have described an example in which the ninth time slot is set as a specific time slot having a possibility of generation of a short pulse, the transmission/reception unit 31 masks the output of the detection unit 33 during all the other time slots having a possibility of generation of a short pulse.

In other words, in the specific slot detection circuit 52, time slots in which switching of the transmission and the reception of a signal occurs between the master 12 and the slave 13 are set as the specific time slots. In more detail, as illustrated in FIG. 5, the specific slot detection circuit 52 is set with a time slot, as the specific time slot, in which the slave 13 transmits an ACK to notify that the reception of a command, an address, or the like transmitted by the master 12 has been completed. In addition, as illustrated in FIG. 6, the specific slot detection circuit 52 is set with a time slot, as the specific time slot, in which the slave 13 transmits the one-bit parity to be transmitted to the master 12 from the slave 13 subsequently to the transmission of data.

<Flowchart of False Detection Avoidance Process>

Figure 9:
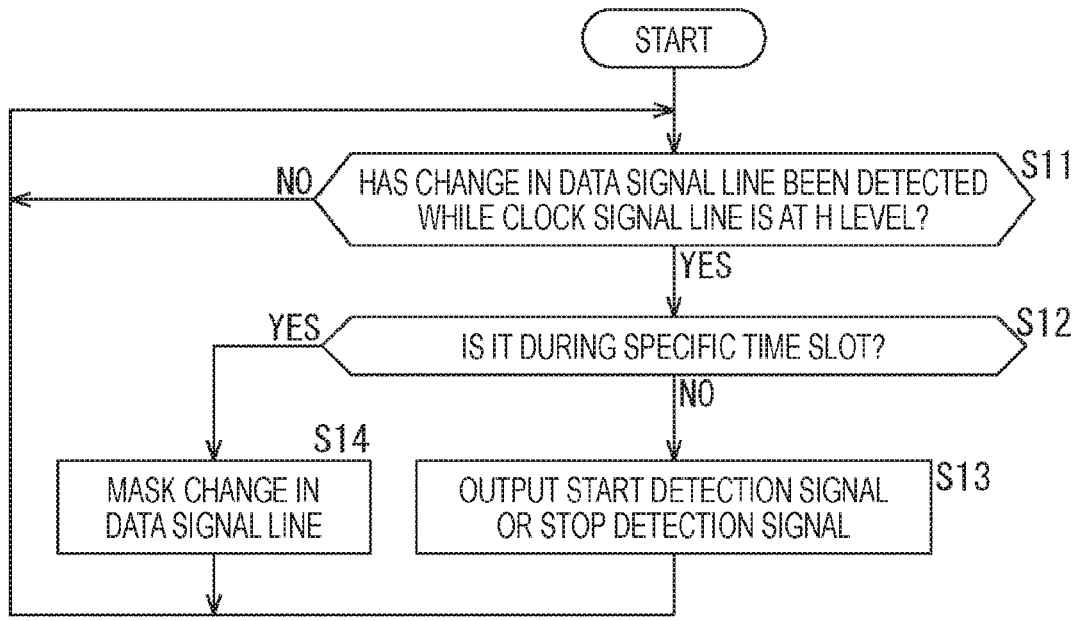
FIG. 9 is a flowchart for explaining a false detection avoidance process in the transmission/reception unit of the slave.

Next, FIG. 9 is a flowchart for explaining a false detection avoidance process in the transmission/reception unit 31 of the slave 13.

For example, the process is initiated when the slave 13 is connected to the data signal line 14-1 and the clock signal line 14-2 and activated. Then, the detection unit 33 constantly monitors the levels of the data signal line 14-1 and the clock signal line 14-2 and, in the false detection avoidance unit 34, the counter circuit 51 counts the count value according to the clock supplied by the clock signal line 14-2.

In step S11, the detection unit 33 determines whether a change in the data signal line 14-1 has been detected while the clock signal line 14-2 is at the H level and stands by for the process until it is determined that such a change has been detected. Then, when the detection unit 33 determines that a change in the data signal line 14-1 has been detected while the clock signal line 14-2 is at the H level, the process proceeds to step S12.

In step S12, the false detection avoidance unit 34 determines, according to the count value of the counter circuit 51, whether it is during the specific time slot having a possibility of generation of a short pulse.

In step S12, in a case where the false detection avoidance unit 34 determines that it is not during the specific time slot having a possibility of generation of a short pulse, the process proceeds to step S13. In step S13, the false detection avoidance unit 34 judges that the change in the data signal line 14-1 detected by the detection unit 33 in step S11 is a declaration of the initiation or end of communication by the master 12 and outputs the start detection signal or the stop detection signal. For example, when a change in the data signal line 14-1 from the H level to the L level is detected, the start detection signal is output and, when a change in the data signal line 14-1 from the L level to the H level is detected, the stop detection signal is output.

On the other hand, in step S12, in a case where the false detection avoidance unit 34 determines that it is during the specific time slot having a possibility of generation of a short pulse, the process proceeds to step S14. In step S14, the false detection avoidance unit 34 masks the change in the data signal line 14-1 detected by the detection unit 33 in step S11 and, in this case, the start detection signal or the stop detection signal is not output.

After the process in step S13 or S14, the process returns to step S11 and a similar process is repeated thereafter.

As described thus far, the transmission/reception unit 31 of the slave 13 invalidates a change in the data signal line 14-1 detected during the specific time slot having a possibility of generation of a short pulse, thereby being able to avoid the false detection of the start condition or the stop condition due to a short pulse.

Note that the present technology is not limited to the bus IF 11 conforming to the I3C standard and can be applied to the bus IF 11 conforming to another standard. In addition, in the bus IF 11 illustrated in FIG. 1, an exemplary configuration in which the slaves 13-1 to 13-3 are connected is illustrated, but the number of the slaves 13 may be one or two, or alternatively, may be three or more, for example.

Note that each of the processes described with reference to the above flowchart does not necessarily need to be handled in line with the order mentioned in the flowchart along the time series. A process executed in parallel or separately (e.g., a parallel process or an object process) is also included. In addition, as for a program, a single CPU may be employed for the process thereof, or alternatively, a plurality of CPUs may be employed for the distributed processes thereof.

Meanwhile, a series of the above-described processes can be executed by hardware as well and also can be executed by software. In a case where the series of the processes is executed by software, a program constituting the software is installed from a program recording medium in which the program is recorded to a computer built into dedicated hardware or a computer capable of executing various types of functions when installed with various types of programs, for example, a general-purpose personal computer and the like.

<Exemplary Hardware Configuration>

Figure 10:
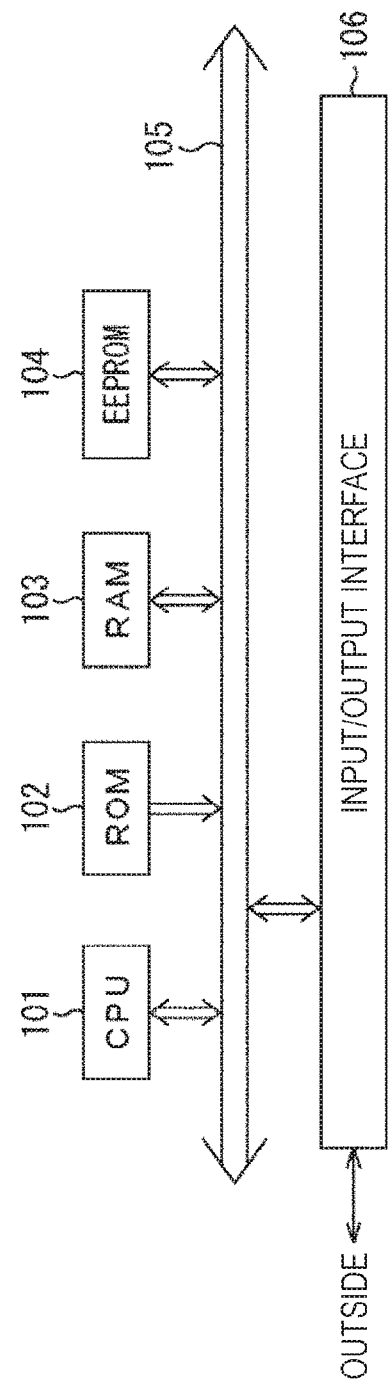
FIG. 10 is a block diagram illustrating an exemplary configuration of a computer according to an embodiment to which the present technology is applied.

FIG. 10 is a block diagram illustrating an exemplary hardware configuration of a computer that executes the above-described series of the processes using a program.

In the computer, a central processing unit (CPU) 101, a read only memory (ROM) 102, a random access memory (RAM) 103, and an electronically erasable and programmable read only memory (EEPROM) 104 are interconnected through a bus 105. An input/output interface 106 is further connected to the bus 105 and the input/output interface 106 is connected to the outside (for example, the data signal line 14-1 and the clock signal line 14-2 in FIG. 1).

In the computer configured as described above, for example, the aforementioned series of the processes is performed in such a manner that the CPU 101 loads programs stored in the ROM 102 and the EEPROM 104 to the RAM 103 via the bus 105 to execute. In addition, the program executed by the computer (CPU 101) can be not only written in the ROM 102 in advance but also installed or updated in the EEPROM 104 from the outside via the input/output interface 106.

Note that the present technology can be also configured as described below.

(1)

A communication apparatus including:

a detection unit that, when detecting a change in level of a signal line representing a declaration of initiation or end of communication by another communication apparatus having an initiative of communication, outputs a detection signal indicating that the change in level of the signal line has been detected; and a false detection avoidance unit that invalidates output of the detection signal during a specific time slot set in advance.

(2)

The communication apparatus according to (1) above, in which the specific time slot is a time slot in which switching of transmission and reception of a signal occurs between the communication apparatus and the another communication apparatus.

(3)

The communication apparatus according to (1) or (2) above, in which the specific time slot is a time slot in which a reception completion notification notifying that reception of a command or an address transmitted from the another communication apparatus has been completed is transmitted.

(4)

The communication apparatus according to any one of (1) to (3) above, in which the specific time slot is a time slot in which a one-bit parity to be transmitted to the another communication apparatus from the communication apparatus subsequently to transmission of data is transmitted.

(5)

The communication apparatus according to any one of (1) to (4) above, in which the detection unit is configured by combining a plurality of flip-flop circuits that outputs a detection signal indicating that the change in level of the signal line representing a declaration of initiation or end of communication has been detected, on the basis of a clock signal and a data signal transmitted from the another communication apparatus via the signal line, and the false detection avoidance unit is configured by combining a counter circuit that initiates to count a count value of the clock signal when a change in level of the signal line representing a declaration of initiation of communication is detected by the detection unit, and a mask circuit that masks the detection signal output by the detection unit according to the count value by the counter circuit during a period of the specific time slot set in advance.

(6)

A communication method including:

a step of outputting, when detecting a change in level of a signal line representing a declaration of initiation or end of communication by another communication apparatus having an initiative of communication, a detection signal indicating that the change in level of the signal line has been detected; and a step of invalidating output of the detection signal during a specific time slot set in advance.

(7)

A program that causes a computer to execute a communication process including:

a step of outputting, when detecting a change in level of a signal line representing a declaration of initiation or end of communication by another communication apparatus having an initiative of communication, a detection signal indicating that the change in level of the signal line has been detected; and a step of invalidating output of the detection signal during a specific time slot set in advance.

(8)

A communication system including: a first communication apparatus having an initiative of communication; and a second communication apparatus that communicates with the first communication apparatus under control of the first communication apparatus, in which the second communication apparatus includes:

a detection unit that, when detecting a change in level of a signal line representing a declaration of initiation or end of the communication by the first communication apparatus, outputs a detection signal indicating that the change in level of the signal line has been detected; and a false detection avoidance unit that invalidates output of the detection signal during a specific time slot set in advance.

(9)

The communication system according to (8) above, being configured such that the first communication apparatus and a plurality of the second communication apparatuses are connected via the signal line.

Note that the embodiments are not limited to the aforementioned embodiments and various modifications can be made without departing from the scope of the present disclosure.

REFERENCE SIGNS LIST

11 Bus IF
12 Master
13 Slave
14 Data signal line
15 Clock signal line
21 Transmission/reception unit
31 Transmission/reception unit
32 Process execution unit
33 Detection unit
34 False detection avoidance unit
41 to 43 Flip-flop circuit
51 Counter circuit
52 Specific slot detection circuit
53 and 54 AND circuit

The invention claimed is:

1. A communication apparatus comprising:
detection circuitry connected to a signal line and configured to detect a change in a level of a data signal on the signal line as received from another communication apparatus, the change representing a declaration of initiation or end of communication by the another communication apparatus having an initiative of communication, and to provide a detection signal indicating that the change in level of the signal line has been detected; and
false detection avoidance circuitry including an input to receive the detection signal provided from the detection circuitry, and configured to prevent output of the detection signal during a specific time slot set in advance, wherein
the detection circuitry includes a plurality of flip-flop circuits that respectively include inputs connected to the signal line and that provide the detection signal on the basis of a clock signal and the data signal transmitted from the another communication apparatus via the signal line, and
the false detection avoidance circuitry includes a counter circuit that initiates to count a count value of the clock signal when a change in level of the signal line representing a declaration of initiation of communication is detected by the detection circuitry, and a mask circuit that masks the detection signal output by the detection circuitry according to the count value by the counter circuit during a period of the specific time slot set in advance.

2. The communication apparatus according to claim 1, wherein
the specific time slot is a time slot in which switching of transmission and reception of a signal occurs between the communication apparatus and the another communication apparatus.

3. A communication apparatus comprising:
detection circuitry connected to a signal line and configured to detect a change in a level of a data signal on the signal line as received from another communication apparatus, the change representing a declaration of initiation or end of communication by the another communication apparatus having an initiative of communication, and to provide a detection signal indicating that the change in level of the signal line has been detected; and
false detection avoidance circuitry including an input to receive the detection signal provided from the detection circuitry, and configured to prevent output of the detection signal during a specific time slot set in advance, wherein
the specific time slot is a time slot in which switching of transmission and reception of a signal occurs between the communication apparatus and the another communication apparatus, and
the specific time slot is a time slot in which a reception completion notification notifying that reception of a command or an address transmitted from the another communication apparatus has been completed is transmitted.

4. A communication apparatus comprising:
detection circuitry connected to a signal line and configured to detect a change in a level of a data signal on the signal line as received from another communication apparatus, the change representing a declaration of initiation or end of communication by the another communication apparatus having an initiative of communication, and to provide a detection signal indicating that the change in level of the signal line has been detected; and
false detection avoidance circuitry including an input to receive the detection signal provided from the detection circuitry, and configured to prevent output of the detection signal during a specific time slot set in advance, wherein
the specific time slot is a time slot in which a one-bit parity to be transmitted to the another communication apparatus from the communication apparatus subsequently to transmission of data is transmitted.

5. A communication method for a communication apparatus, the method comprising:
detecting, by detection circuitry connected to a signal line, a change in a level of a data signal on the signal line as received from another communication apparatus, the change representing a declaration of initiation or end of communication by the another communication apparatus having an initiative of communication, and providing a detection signal indicating that the change in level of the signal line has been detected; and
receiving, by false detection avoidance circuitry, the detection signal provided from the detection circuitry, and preventing output of the detection signal during a specific time slot set in advance, wherein
the detection circuitry includes a plurality of flip-flop circuits that respectively include inputs connected to the signal line and that provide the detection signal on the basis of a clock signal and the data signal transmitted from the another communication apparatus via the signal line, and
the false detection avoidance circuitry includes a counter circuit that initiates to count a count value of the clock signal when a change in level of the signal line representing a declaration of initiation of communication is detected by the detection circuitry, and a mask circuit that masks the detection signal output by the detection circuitry according to the count value by the counter circuit during a period of the specific time slot set in advance.

6. A non-transitory computer readable medium storing program code for a communication process, the program code being executable by a computer to perform operations comprising:

detecting, by detection circuitry connected to a signal line, a change in a level of a data signal on the signal line as received from another communication apparatus, the change representing a declaration of initiation or end of communication by the another communication apparatus having an initiative of communication, and providing a detection signal indicating that the change in level of the signal line has been detected; and receiving, by false detection avoidance circuitry, the detection signal provided from the detection circuitry, and preventing output of the detection signal during a specific time slot set in advance, wherein the detection circuitry includes a plurality of flip-flop circuits that respectively include inputs connected to the signal line and that provide the detection signal on the basis of a clock signal and the data signal transmitted from the another communication apparatus via the signal line, and the false detection avoidance circuitry includes a counter circuit that initiates to count a count value of the clock signal when a change in level of the signal line representing a declaration of initiation of communication is detected by the detection circuitry, and a mask circuit that masks the detection signal output by the detection circuitry according to the count value by the counter circuit during a period of the specific time slot set in advance.

7. The method according to claim 5, wherein
   the specific time slot is a time slot in which switching of transmission and reception of a signal occurs between the communication apparatus and the another communication apparatus.

8. The method according to claim 7, wherein
   the specific time slot is a time slot in which a reception completion notification notifying that reception of a command or an address transmitted from the another communication apparatus has been completed is transmitted.

9. The method according to claim 5, wherein
   the specific time slot is a time slot in which a one-bit parity to be transmitted to the another communication apparatus from the communication apparatus subsequently to transmission of data is transmitted.

10. The computer readable medium according to claim 6, wherein
    the specific time slot is a time slot in which switching of transmission and reception of a signal occurs between the communication apparatus and the another communication apparatus.

11. The computer readable medium according to claim 10, wherein
    the specific time slot is a time slot in which a reception completion notification notifying that reception of a command or an address transmitted from the another communication apparatus has been completed is transmitted.

12. The computer readable medium according to claim 6, wherein
    the specific time slot is a time slot in which a one-bit parity to be transmitted to the another communication apparatus from the communication apparatus subsequently to transmission of data is transmitted.

* * * * *